United States Patent [19]

Knödler et al.

[11] Patent Number: 4,921,766

[45] Date of Patent: May 1, 1990

[54] ELECTROCHEMICAL STORAGE CELL

[75] Inventors: Reinhard Knödler, Sandhausen; Karl Reiss, Mühlhausen-Rettigheim, both of Fed. Rep. of Germany

[73] Assignee: Asea Brown Boveri Aktiengesellschaft, Mannheim, Fed. Rep. of Germany

[21] Appl. No.: 285,702

[22] Filed: Dec. 16, 1988

[30] Foreign Application Priority Data

Dec. 16, 1987 [DE] Fed. Rep. of Germany ....... 3742608

[51] Int. Cl.⁵ ............................................ H01M 10/39
[52] U.S. Cl. ................................................. 429/104
[58] Field of Search ......................................... 429/104

[56] References Cited

U.S. PATENT DOCUMENTS

| 4,117,209 | 9/1978 | Markin et al. | 429/104 |
| 4,173,686 | 11/1979 | Brennan | 429/104 |
| 4,216,275 | 8/1980 | Hartmann et al. | 429/104 |
| 4,492,021 | 1/1985 | Wright et al. | 429/104 |

Primary Examiner—Donald L. Walton
Attorney, Agent, or Firm—Herbert L. Lerner; Laurence A. Greenberg

[57] ABSTRACT

A sodium-sulphur electrochemical storage cell is bounded externally by a metallic housing, which has a ternary inexpensive corrosion-protective coating formed of an alloy with essential components consisting of aluminum, chromium and iron.

3 Claims, 1 Drawing Sheet

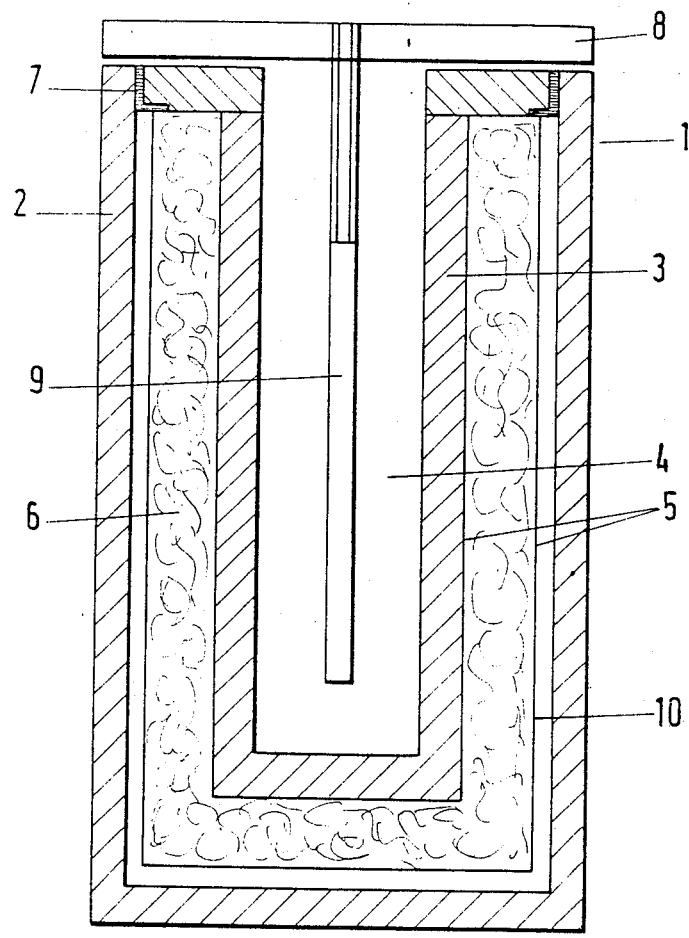

ELECTROCHEMICAL STORAGE CELL

BACKGROUND OF THE INVENTION

1. Field of the Invention

The invention relates to an electrochemical sodium/sulfur storage cell of the type having anode and cathode spaces separated by a solid electrolyte and enclosed, at least in part, within a metallic housing.

Electrochemical storage cells of this type are very highly suitable as energy source. They are used to an increasing extent in the construction of high-temperature storage batteries for electric vehicles.

2. Description of the Related Art

A specific example of this type of cell is a rechargeable cell based on sodium and sulphur, and which has a solid beta-aluminum oxide electrolyte separating the anode space from the cathode space. An advantage of such storage cells, which should be emphasized, is that no electrochemical side reactions occur on charging and the current efficiency is therefore substantially about 100%. In storage cells of this type, the anode space is filled with sodium and is disposed within the solid electrolyte. The cathode space is located between the solid electrolyte and the metallic housing or container, which limits the storage cell externally. A light metal, in particular aluminum, is preferably used for the housing.

The reactants present in the storage cell and the reaction products formed on discharge of the storage cell are very corrosive. The metallic components of the housing which come into prolonged contact with the reactants therefore are subject to corrosive destruction in time. In order to alleviate this disadvantage, it has been proposed, in the journal "Thin Solid Films 83", page 417, to provide the inner surfaces of the metallic housing of such storage cells with a corrosion-protective coating.

The corrosion-protective material described is an alloy of chromium, nickel, cobalt and molybdenum.

German Published, Non-Prosecuted Application DE-OS No. 24 57 418 discloses an electrochemical storage cell on the inner surfaces of which a corrosion protective coating of graphite is applied.

U.S. Pat. No. 3,749,603 describes a metallic housing made from light metal having inner surfaces which are protected against corrosion by a molybdenum sulphide coating.

German Published, Non-Prosecuted Application DE-OS No. 31 17 381 discloses the production of an electrochemical storage cell, in which the inner surfaces of the metallic housing are coated with titanium, manganese, iron, cobalt or nickel.

Although the above-mentioned coatings are capable of improving the corrosion resistance of the housing in the short term, they have the disadvantage that the internal resistance of the storage cells increases very greatly with increasing age, due to formation of sulphide-containing or other non-conductive coatings on the inner wall of the housing. Furthermore, most of these materials used for corrosion protection are expensive, which significantly increases the overall cost of the storage cell.

SUMMARY OF THE INVENTION

It is accordingly an object of the invention to provide an electrochemical storage cell, which overcomes the hereinafore-mentioned disadvantages of the heretofore-known devices of this general type and which has a housing made from light metal which has a corrosion-protective coating and which is inexpensive to produce.

With the foregoing and other objects in view there is provided, in accordance with the invention, a sodium-sulphur electrochemical storage cell, comprising a metallic housing or container provided at least on its inner surface with a corrosion-protective coating, and containing a solid electrolyte which conducts alkali metal ions provided in said housing, said solid electrolyte separating the cathode region from an anode region, said corrosion-protective coating being formed by an alloy which contains, as essential components thereof, at least one light metal and at least one heavy metal.

The storage cell according to this invention has a corrosion-protective coating which contains no expensive materials such as titanium or molybdenum and includes only the small amounts of chromium that are necessary for its formation. Only small amounts of chromium are used as an excess of chromium has adverse effects on the corrosion resistance in this corrosion-protective coating.

The electrical resistance of the coating is low and it retains the same low resistance value even after a relatively long period. This is important because a corrosion-protective coating formed using only aluminum in pure form, tends to form nonconducting aluminum sulphide. The corrosion-protective coating according to this invention has the quality of forming only electroconductive mixed sulphides on its surface, even after the storage cell has been operated for a relatively long period and many cycles. The aluminum content in the alloy used for formation of the corrosion-protective coating is of essential importance. It must be limited between 9 and 13% by weight, relative to the total weight of the alloy and must be within these limits. If the amount of aluminum falls below this critical range, the corrosion susceptibility of the protective coating is increased. If the aluminum content is increased to more than 13% by weight, the electrical resistance of the storage cell increases, particularly in the presence of sodium polysulphide.

The proportion of chromium in the coating alloy should be from 20 to 30% by weight, relative to the total weight of the alloy. Again, this amount is critical and should not fall outside this range. The remainder of the alloy is iron.

According to this invention, this substantially ternary alloy is applied to the inner surfaces of the cell housing by plasma spraying, which ensures good adhesion of the corrosion-protective coating.

Other features which are considered as characteristic for the invention are set forth in the appended claims. Although the invention is illustrated and described herein as embodied in an electrochemical storage cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of a specific embodiment when read in connection with the accompanying drawing.

BRIEF DESCRIPTION OF DRAWING

The single FIGURE of the drawing is a diagrammatic, cross-sectional view of an electrochemical storage cell bounded externally by a metallic housing.

DESCRIPTION OF THE PREFERRED EMBODIMENT

Referring now in detail to the single figure of the drawing, there is seen an electrochemical storage cell 1 bounded externally by a metallic housing 2. In the embodiment shown, the housing is a cylindrical shell in cup form and is produced from light metal, preferably aluminum.

A similarly cylindrical solid electrolyte 3 is disposed in the interior of the housing 2. It is produced from beta-aluminum oxide and its interior anode space 4 serves to contain the anode, which is filled with sodium. The dimensions of the solid electrolyte 3 are selected so that between its outer surfaces and the inner surfaces of the metallic housing 2 there remains a coherent interspace 5, which serves as the cathode space. The cathode space contains the cathode electrode 6, which is produced from a porous felt or fibrous material based on graphite or carbon and is impregnated with sulphur.

The inner surfaces of the housing are coated with a corrosion-protective coating 10. This corrosion-protective coating 10 formed by the substantially ternary alloy whose essential components are aluminum, chromium and iron.

The corrosion-protective ternary alloy contains from about 9 to about 13% by weight of aluminum and from about 20 to about 30% by weight of chromium, relative to the total weight of the alloy, the remainder of the alloy being essentially iron.

The corrosion-protective alloy in powder form is preferably applied to the inner surfaces of the housing by means of plasma spraying or flange spraying.

Before application of the corrosion-protective coating, the inner surfaces to be protected of the housing 2 are cleaned. Application of the alloy-forming powder by means of plasma spraying ensures adhesion of the corrosion-protective coating 10 to the inner surfaces of the housing. The corrosion-protective coating 10 is preferably applied to a thickness substantially of about 0.1 mm on the inner surfaces of the housing 2. Such an alloy coating has an expansion coefficient and elasticity which is sufficiently large to ensure that mechanical stresses, which occur on heating and cooling of the storage cell, do not result in cracking in the corrosion-protective coating 10.

After formation of the corrosion-protective coating 10, the storage cell 1 is assembled by initially filling the cathode space 5 with the cathode electrode assembly 6, which contains the sulphur, and subsequently inserting the solid electrolyte 3 into the metallic housing 2. An insulation ring 7 produced from alpha-aluminum oxide is disposed at the open end of the solid electrolyte 3. This ring is joined to the solid electrolyte 3 via a glass solder (not shown here) and projects externally forming a flange. The dimensions of the ring 7 are selected so that it is in contact with the inner surface of the metallic housing 2 and thus seals the cathode space 5 externally. The entire internal space of the storage cell 1 is sealed by a cover 8 which is durably joined to the metallic housing 2. The cover 8 is produced from an electroconductive material. A rod 9, which is likewise produced from an electroconductive material and serves as the anodic current collector, is attached to its downward-facing side of the cover 8. The metallic housing 2 serves as the cathodic current collector.

The foregoing is a description corresponding in substance to German Application No. P 37 42 608.7, dated Dec. 16, 1987, the International priority of which is being claimed for the instant application, and which is hereby made part of this application. Any material discrepancies between the foregoing specification and the aforementioned corresponding German application are to be resolved in favor of the latter.

We claim:

1. A sodium-sulfur electrochemical storage cell, comprising a metallic housing and containing said cell within said housing, said cell comprising an anode, a cathode and a solid electrolyte separating said anode from said cathode and capable of conducting alkali metal ions therebetween, said metallic housing being coated on its inner surface with a layer of corrosion-protective ternary alloy coating, essentially consisting of about 9 to 13% by weight of aluminum, about 20 to 30% by weight of chromium, the balance being iron.

2. The electrochemical storage cell according to claim 1, wherein the corrosion-protective ternary alloy coating is applied to a thickness of 0.1 mm to the inner surface of about the metallic housing.

3. In a sodium-sulfur electrochemical storage cell assembly, comprising an aluminum-based metallic housing having an inner surface, and a sodium-sulfur electrochemical storage cell within said housing, said cell comprising an anode, a cathode, and a solid electrolyte separating said anode from said cathode for conducting alkali metal ions between said anode and said cathode, the improvement which consists of a corrosion-protective ternary alloy coating said inner surface of said aluminum housing, said ternary alloy essentially consisting of about 9 to 13 wt.% of aluminum, about 20 to 30 wt.% of chromium and the balance being iron.

* * * * *